United States Patent
Hasegawa

(10) Patent No.: US 9,240,829 B2
(45) Date of Patent: Jan. 19, 2016

(54) TRANSMITTING APPARATUS, RECEIVING APPARATUS, RADIO COMMUNICATION SYSTEM, AND RADIO COMMUNICATION METHOD

(71) Applicant: FUJITSU LIMITED, Kawasaki-shi, Kanagawa (JP)

(72) Inventor: Tsuyoshi Hasegawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 17 days.

(21) Appl. No.: 13/652,601

(22) Filed: Oct. 16, 2012

(65) Prior Publication Data
US 2013/0039400 A1 Feb. 14, 2013

Related U.S. Application Data

(63) Continuation of application No. PCT/JP2010/057001, filed on Apr. 20, 2010.

(51) Int. Cl.
*G01R 25/00* (2006.01)
*H04B 7/14* (2006.01)
*H04B 7/06* (2006.01)
*H04B 7/04* (2006.01)

(52) U.S. Cl.
CPC ............ *H04B 7/0608* (2013.01); *H04B 7/0413* (2013.01); *H04B 7/0691* (2013.01)

(58) Field of Classification Search
CPC .. H04B 7/0617; H04B 7/0695; H04B 7/0634; H04B 7/0417; H04B 7/10; H04B 7/0456; H04B 7/0802
See application file for complete search history.

(56) References Cited

U.S. PATENT DOCUMENTS

| 5,295,153 | A | * | 3/1994 | Gudmundson | H04B 7/2628 370/335 |
|---|---|---|---|---|---|
| 5,349,630 | A | * | 9/1994 | Sointula | H04W 48/20 455/423 |
| 5,854,786 | A | * | 12/1998 | Henderson | H04W 92/12 370/218 |
| 6,272,354 | B1 | * | 8/2001 | Saario | H04W 52/50 455/422.1 |
| 8,260,208 | B2 | | 9/2012 | Auer | |
| 2001/0026540 | A1 | * | 10/2001 | Haim | H04B 1/707 370/329 |
| 2003/0016635 | A1 | * | 1/2003 | Andrews | H04W 16/10 370/328 |
| 2004/0162021 | A1 | * | 8/2004 | Seki et al. | 455/39 |
| 2004/0198387 | A1 | * | 10/2004 | Tsuji | G01S 5/0036 455/456.1 |
| 2005/0213682 | A1 | * | 9/2005 | Han et al. | 375/267 |
| 2006/0223546 | A1 | * | 10/2006 | Claussen | H04W 24/02 455/456.1 |

(Continued)

FOREIGN PATENT DOCUMENTS

| JP | 2007-89113 | 4/2007 |
|---|---|---|
| JP | 2007-159067 | 6/2007 |

(Continued)

OTHER PUBLICATIONS

International Search Report dated Aug. 3, 2010, from corresponding International Application No. PCT/JP2010/057001.

(Continued)

*Primary Examiner* — Chieh M Fan
*Assistant Examiner* — Sarah Hassan
(74) *Attorney, Agent, or Firm* — Katten Muchin Rosenman LLP

(57) ABSTRACT

A transmitting apparatus includes multiple antennas between which an antenna interval is variable; and a transmitter that transmits a pilot signal using an antenna selected from among the antennas and based on a correlation value representing correlation between the antennas.

5 Claims, 14 Drawing Sheets

(56) References Cited

U.S. PATENT DOCUMENTS

| | | | |
|---|---|---|---|
| 2008/0129608 A1* | 6/2008 | Amano et al. | 343/702 |
| 2009/0296563 A1 | 12/2009 | Kishiyama et al. | |
| 2009/0310697 A1* | 12/2009 | Yu et al. | 375/267 |
| 2009/0325627 A1* | 12/2009 | Lee | 455/522 |
| 2010/0087151 A1 | 4/2010 | Auer | |
| 2011/0134901 A1 | 6/2011 | Hoshino et al. | |
| 2012/0230320 A1 | 9/2012 | Kishiyama et al. | |

FOREIGN PATENT DOCUMENTS

| | | |
|---|---|---|
| JP | 2009-171025 | 7/2009 |
| JP | 2009-188535 | 8/2009 |
| JP | 2009-267800 | 11/2009 |
| JP | 2010-4243 | 1/2010 |
| JP | 2010-56844 | 3/2010 |
| JP | 2010-88116 | 4/2010 |
| WO | 02/091625 | 11/2002 |
| WO | 2010/016183 | 2/2010 |

OTHER PUBLICATIONS

International Preliminary Report on Patentability and Written Opinion of the International Searching Authority dated Nov. 15, 2012, from corresponding International Application No. PCT/JP2010/057001.

Notice of Rejection dated Oct. 29, 2013, from corresponding Japanese Application No. 2012-511440.

* cited by examiner

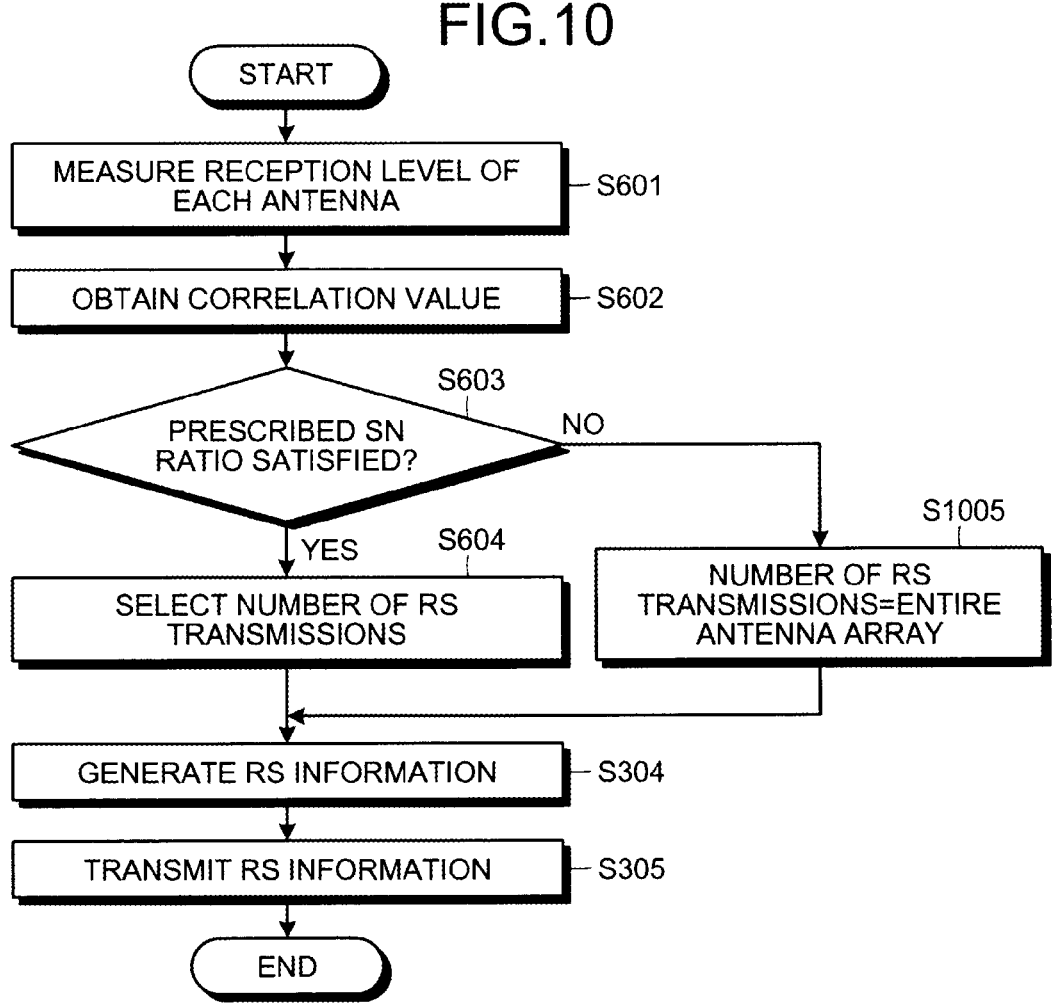
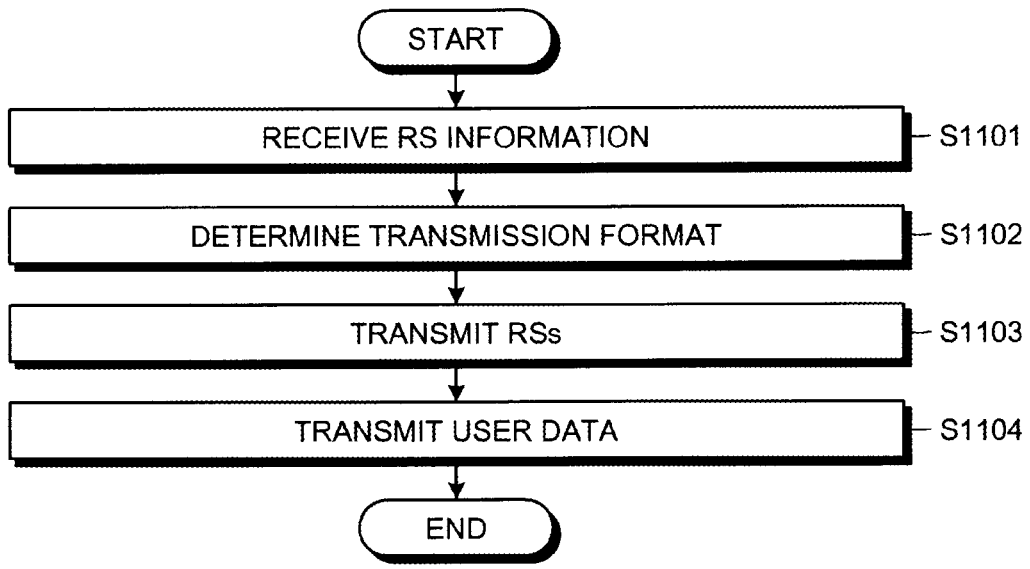

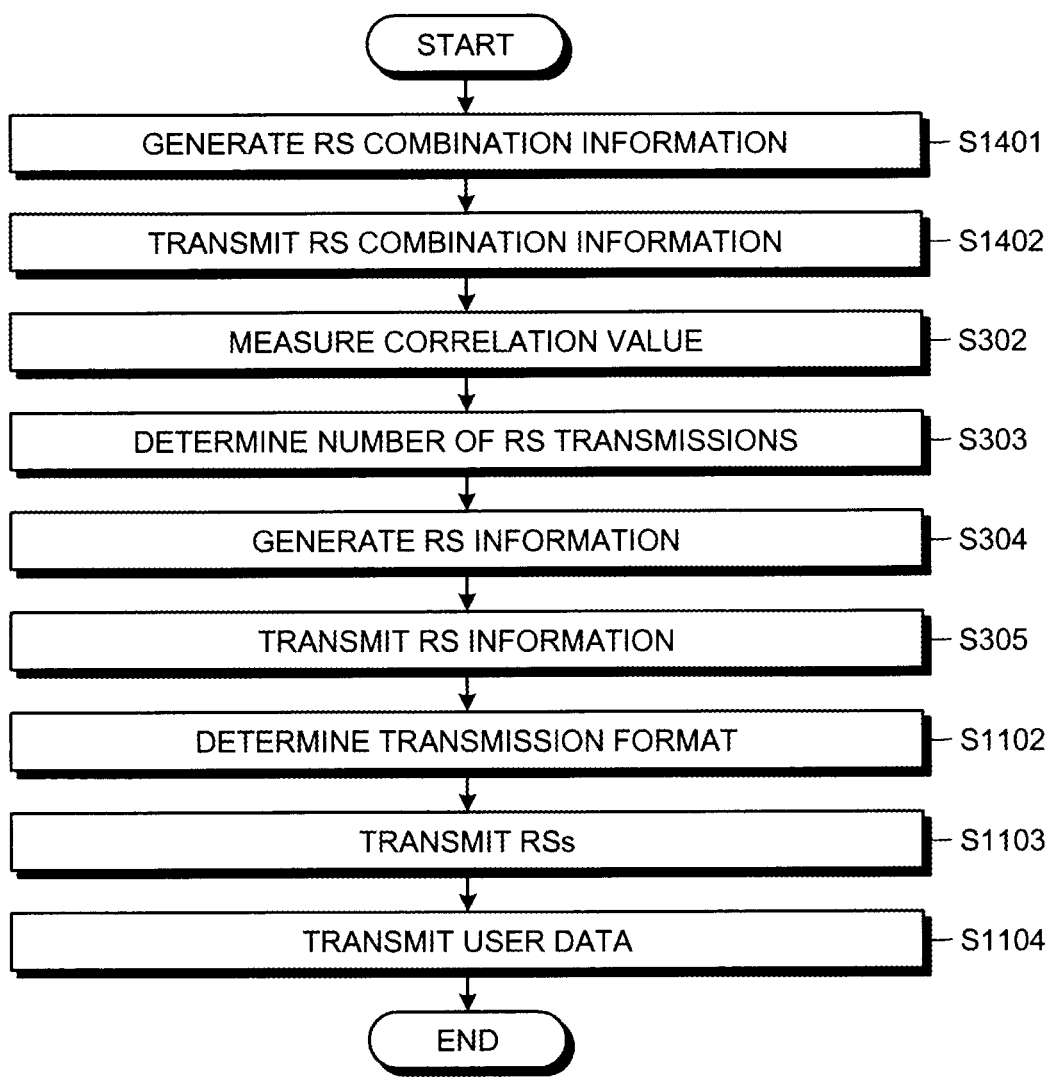

ns is fixed at the transmission-side unit, the fixed number of RS transmissions is not the optimal number. Cellular phones, PDA, portable personal computer, etc., are examples of as such mobile terminals.

TRANSMITTING APPARATUS, RECEIVING APPARATUS, RADIO COMMUNICATION SYSTEM, AND RADIO COMMUNICATION METHOD

CROSS REFERENCE TO RELATED APPLICATIONS

This application is a continuation application of International Application PCT/JP2010/057001, filed on Apr. 20, 2010 and designating the U.S., the entire contents of which are incorporated herein by reference.

FIELD

The embodiments discussed herein are related to a transmitting apparatus, a receiving apparatus, a radio communication system, and a radio communication method that transmit and receive pilot signals from radio equipment that carries out radio communication, such as, radio equipment having a multiplicity of antennas.

BACKGROUND

In a synchronous communication system that synchronizes a transmission-side unit and a reception-side unit, the transmission-side unit transmits a pilot signal (reference signal (RS)) from each transmission antenna and the reception-side unit carries out a process of estimating a propagation path based on the RS. In recent years, a method of using multiple antennas, such as Multiple Input Multiple Output (MIMO), has been proposed for radio communication. According to this method, an RS is transmitted from each transmission antenna to acquire a propagation path for each antenna. In this case, when an RS is transmitted from a given antenna, other antennas are not allowed to transmit signals. As the number of transmission antennas increases, therefore, overhead for transmission of RSs other than data increases, which leads to a decline in transmission efficiency.

To reduce the volume of RS transmissions, a method has been conceived, according to which some antennas among multiple antennas transmit RSs. For example, when transmission-side antennas are close to each other over an extremely small interval, the correlation between propagation paths is large. For this reason, the transmission-side unit transmits RSs from some antennas and the reception-side unit estimates propagation paths for antennas other than the antennas having transmitted the RSs by an interpolating process. This method is known as a method for improving data transmission efficiency (see, e.g., Japanese Laid-Open Patent Publication No. 2007-089113).

When the transmission-side unit is a small-sized mobile terminal, antennas are installed in a limited space and the interval between the antennas tends to be narrower. In such a case, the above method of culling RSs is considered to be effective. However, for some mobile terminals, a variation in the shape of the terminal results in a variation in the intervals between antennas. For example, in a case of a foldable mobile terminal or slidable mobile terminal, the distance between antennas when the terminal is closed is different from that when the terminal is opened. Consequently, the correlation between the antennas varies depending on whether the terminal is opened or closed. For example, opening the mobile terminal widens the antenna interval, thus reducing the correlation, while closing the terminal narrows the antenna interval, thus increasing the correlation. For this reason, in the case of a mobile terminal whose shape varies, if the number of RS transmissions is fixed at the transmission-side unit, the fixed number of RS transmissions is not the optimal number. Cellular phones, PDA, portable personal computer, etc., are examples of as such mobile terminals.

In the conventional communication system, when the correlation between antennas of the mobile terminal varies, the transmission-side unit cannot perform transmission by the optimal number of RS transmissions corresponding to the correlation variation nor suppress the transmission of unnecessary RSs from unselected antennas. The transmission of unnecessary RSs makes reductions in the transmission power impossible and raises a concern of interference with other reception-side units (base station) or other mobile terminals. When the transmission-side unit is a mobile terminal, a variation in the shape causes the correlation between antennas to vary. The mobile terminal is not able to deal with this correlation variation and is, therefore, not able to transmit/receive main data using the optimal number of RS transmissions. The reception-side unit not knowing the optimal number of RS transmissions is incapable of carrying out accurate antenna interpolation. Hence, transmission efficiency and quality cannot be improved.

SUMMARY

According to an aspect of an embodiment, a transmitting apparatus includes multiple antennas between which an antenna interval is variable; and a transmitter that transmits a pilot signal using an antenna selected from among the antennas and based on a correlation value representing correlation between the antennas.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 is a flowchart of a process of determining the number of RS transmissions carried out by the base station apparatus;

FIG. 11 is a flowchart of an RS transmission process carried out by the mobile terminal;

FIG. 13 is a table indicating an example of combination patterns by the number of RS transmissions;

FIG. 14 is a flowchart of an RS transmission process using RS combination information carried out by the mobile terminal;

DESCRIPTION OF EMBODIMENTS

Preferred embodiments of the invention will be described in detail with reference to the accompanying drawings. The disclosed technology applies to, for example, a mobile terminal whose shape varies. According to the technology, the antenna to be used from among an array of antennas is switched according to a variation in the shape of the terminal so that an RS is transmitted from a proper antenna according to the shape. The following embodiments will be explained on the assumption that a transmission-side unit is a mobile terminal 101 and a reception side unit is a base station apparatus 110, and that in response to a variation in an antenna interval at the transmission-side mobile terminal 101, the number of antennas that transmit RSs (number of RS transmissions) is selected and changed.

Figure 1:
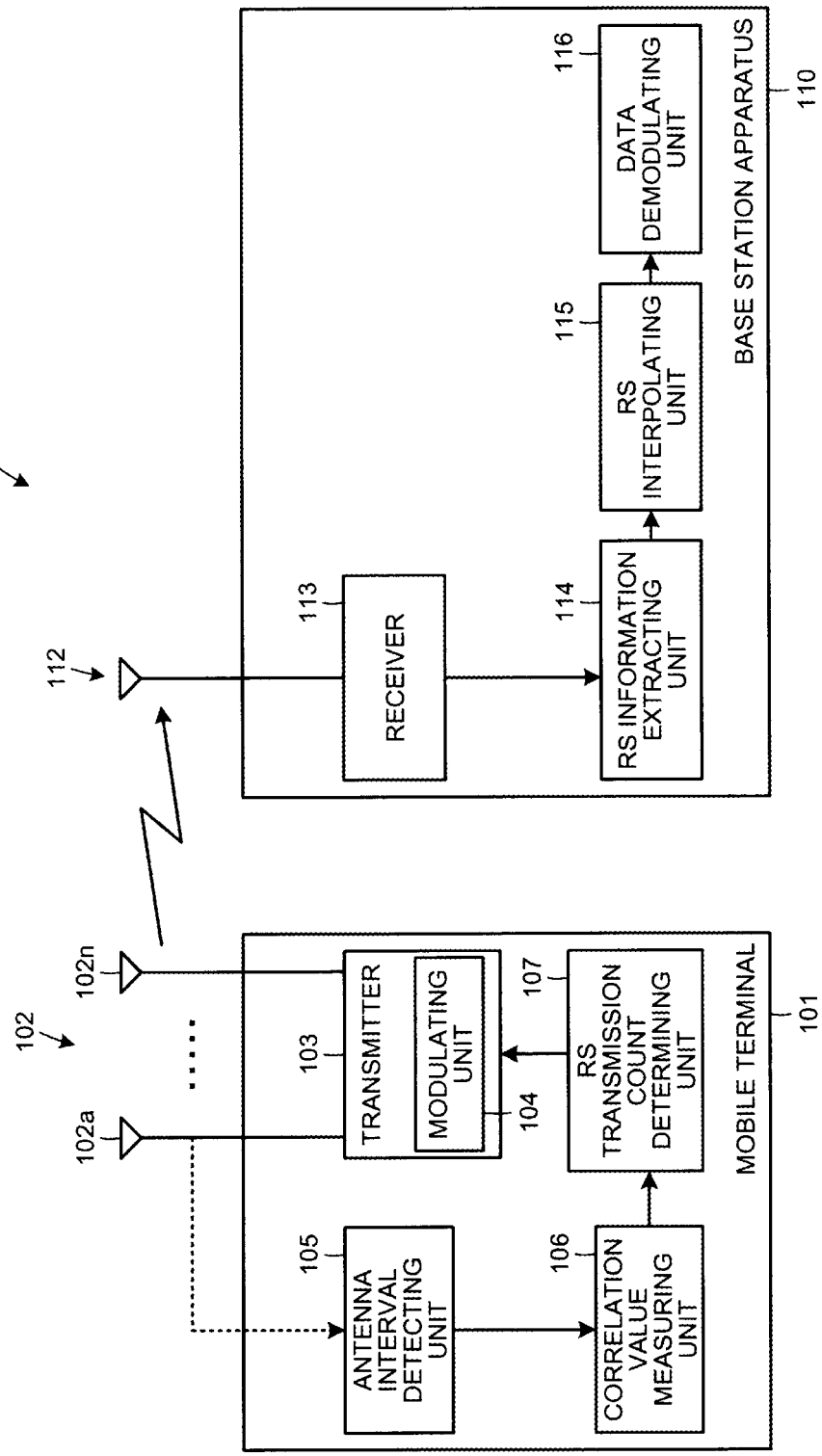
FIG. 1 is a block diagram of a configuration of a communication system according to a first embodiment.

FIG. 1 is a block diagram of a configuration of a communication system according to a first embodiment. This communication system 100 includes the mobile terminal 101 and the base station apparatus 110. The mobile terminal 101 has an antenna array 102 and a transmitter 103 that transmits data via the antenna array 102. The antenna array 102 has an array of n antennas including antennas 102a to 102n. The transmitter 103 has a modulating unit 104, and transmits user data and control data by a modulation method adopted by the modulating unit 104. The antenna array 102 incorporates a pilot signal RS and RS information into control data and transmits the control data from a selected RS transmitting antenna using a control channel.

A specific antenna selected as an RS transmitting antenna is determined based on an antenna interval, which is detected by an antenna interval detecting unit 105. A correlation value measuring unit 106 measures a correlation value corresponding to the detected antenna interval. An RS transmission count determining unit 107 determines the number of RS transmissions corresponding to the measured correlation value. Based on the determined number of RS transmissions, the RS transmission count determining unit 107 selects a specific antenna from among the antennas making up the antenna array 102, and determines the selected antenna to be an RS transmitting antenna.

Upon selecting an antenna, the RS transmission count determining unit 107 does not select antennas close (adjacent) to each other from among the antennas of the antenna array 102 but makes antenna selection by culling each given number of antennas. The RS transmission count determining unit 107 then incorporates RSs and RS information into part of the control data. User data, which is not depicted, is input to the transmitter 103 by user operation at the mobile terminal 101, is modulated by the modulating unit 104, and is transmitted from the antenna array 102 to the base station apparatus 110 via a user channel.

At the base station apparatus 110 having an antenna 112, a receiver 113 receives control data and user data. An RS information extracting unit 114 extracts the number of RS transmissions from the RS information included in the control data. An RS interpolating unit 115 carries out an RS interpolating process on an antenna of the mobile terminal 101 that does not transmit an RS. To allow the RS interpolating unit 115 to carry out the RS interpolating process, information of the antenna array 102 of the transmission-side mobile terminal 101 is set in advance in the RS interpolating unit 115. For example, the set information includes information of the number of antennas making up the antenna array 102 that the mobile terminal 101 has and information of antennas corresponding to the number of RS transmissions. A data demodulating unit 116 demodulates and decodes user data using RSs and a channel estimate determined based on an interpolated RS. The antenna 112 of the base station apparatus 110 may be an antenna array having an array of n antennas including antennas 112a to 112n.

Calculation processes carried out by the correlation value measuring unit 106, RS transmission count determining unit 107, etc., of the mobile terminal 101 in FIG. 1 are realized by a communication processing function by a communication processing processor (CPU) included in the mobile terminal 101 and execution of a prescribed program for measuring a correlation value and determining the number of RSs. In the same manner, the RS information extracting unit 114, RS interpolating unit 115, data demodulating unit 116, etc., of the base station apparatus 110 are realized using a communication processing processor.

Figure 2:
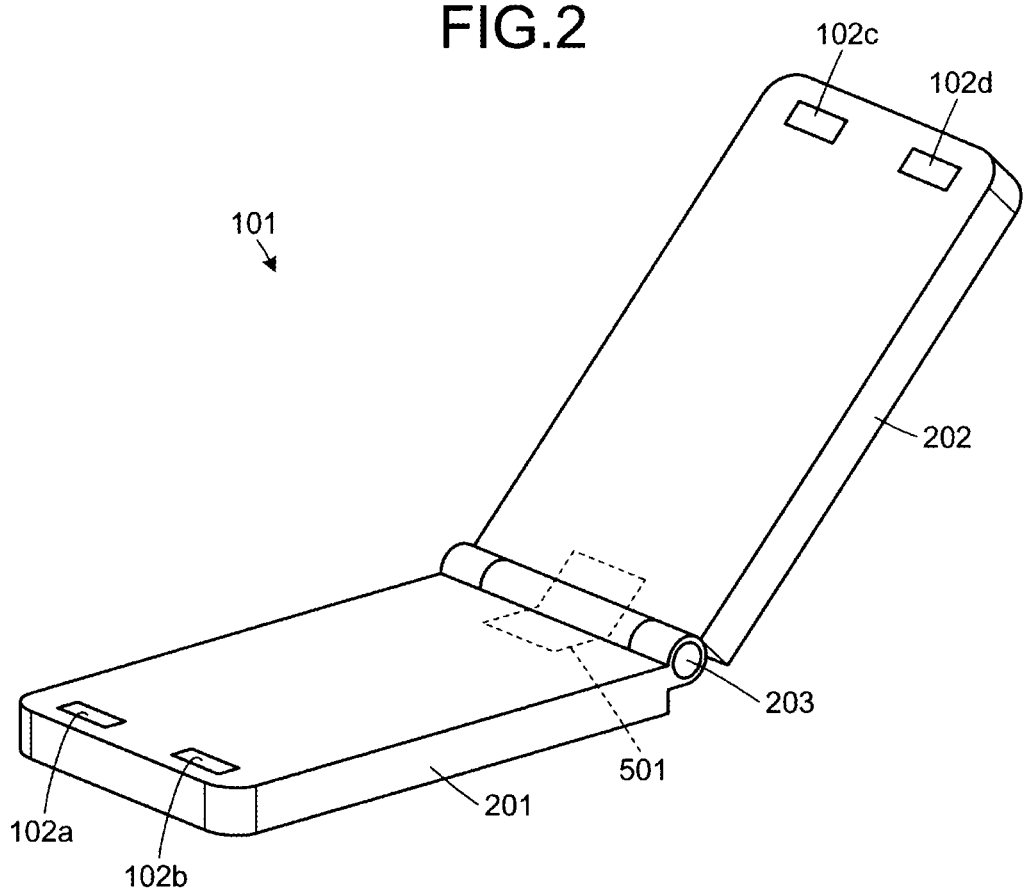
FIG. 2 is an external view of a configuration example of a mobile terminal according to the embodiment.

FIG. 2 is an external view of a configuration example of the mobile terminal according to the embodiment. The mobile terminal 101 of FIG. 2 includes a body 201, a cover 202, and the antenna array 102 including four (n=4) antennas, of which two antennas 102a and 102b are disposed on the body 201 and the other two antennas 102c and 102d are disposed on the cover 202. The cover 202 is connected to the body 201 via a hinge 203, which makes the cover 202 foldable. As depicted in FIG. 2, when the cover 202 is in an opened state, the antennas 102c and 102d of the cover 202 are away from the antennas 102a and 102b of the body 201, which gives a wider antenna interval. In contrast, when the cover 202 is in a closed state, the antennas 102c and 102d of the cover 202 come closer to the antennas 102a and 102b of the body 201, which gives a narrower antenna interval. Hence, the antenna interval varies as the state of the cover 202 varies between the opened and closed states.

In the example depicted in FIG. 2, the antenna interval detecting unit 105 detects a rotation angle of the hinge 203 and converts the detected angle into an interval between the antennas and outputs an antenna interval. Since the shape of the mobile terminal 101 is determined by a rotation angle of the hinge 203, a correlation value representing the correlation between the antennas is determined by the rotation angle of the hinge 203 on the condition that no radio wave scattering object is present nearby. When a rotation angle of the hinge 203 is used in this manner, correlation values corresponding to rotation angles acquired through measurement, etc., are stored in advance in the mobile terminal 101, so that a correlation value can be acquired using an actual rotation angle. As a result, calculation of a correlation value is omitted to save the processor, etc., of the mobile terminal 101 from processing load.

For example, in the configuration example depicted in FIG. 2, when the cover 202 is in a closed state, the antenna 102c of the cover 202 comes closer to the antenna 102a of the body 201 and the antenna 102d of the cover 202 comes closer to the antenna 102b of the body 201. In this state, an RS is transmitted from only one of the antennas 102a and 102c close to each other and one of the antennas 102b and 102d close to each other. For example, when the cover 202 is in a closed state, RSs are transmitted from the antennas 102a and 102b of the body 201, at which the number of RS transmissions is "2". The RS interpolating unit 115 of the base station apparatus 110 stores therein information of the antenna array 102 corresponding to the number of RS transmissions, and acquires information indicative of transmission of RSs from the antennas 102a and 102b when the number of RS transmissions is "2".

Figure 3:
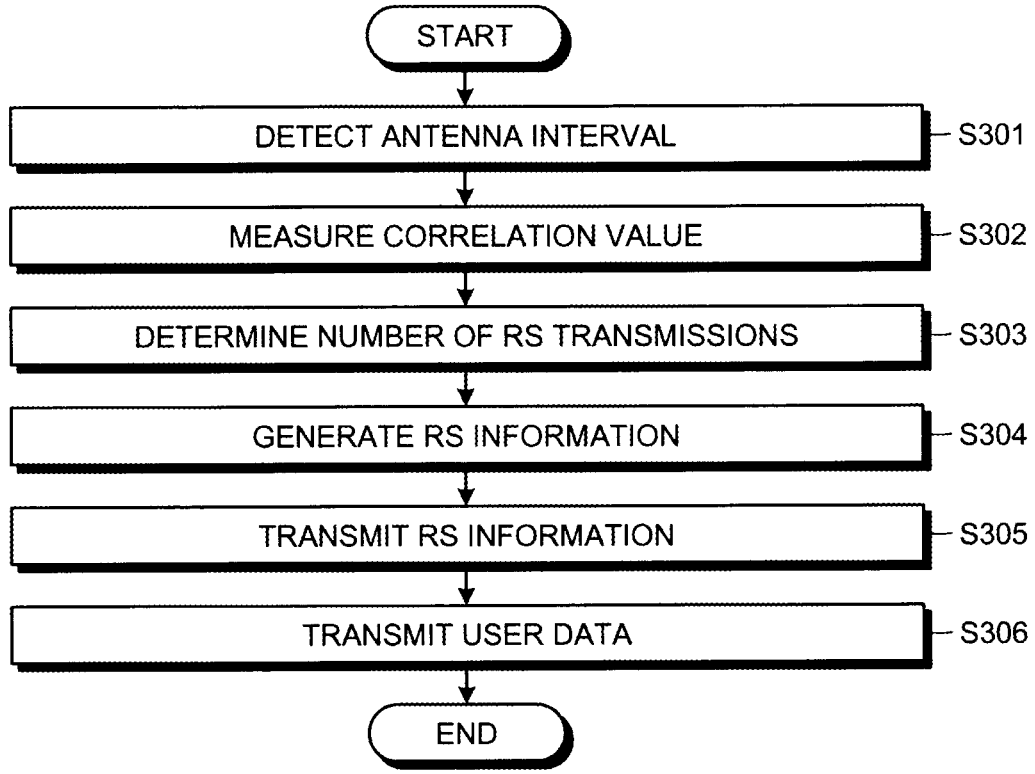
FIG. 3 is a flowchart of an RS transmission process carried out by a transmission-side mobile terminal.

FIG. 3 is a flowchart of an RS transmission process carried out by the transmission-side mobile terminal. The mobile terminal 101 executes the following process at least when transmitting user data. The antenna interval detecting unit 105 detects an antenna interval (step S301). The correlation value measuring unit 106 measures a correlation value for antennas, based on the detected antenna interval (step S302). The RS transmission count determining unit 107 determines the number of RS transmissions according to the acquired correlation value (step S303). Here, an antenna that is to transmit an RS is determined from among the antennas making up the antenna array 102 that transmits RSs according to the determined number of RS transmissions. The RS transmission count determining unit 107 generates the number of RS transmissions as RS information (step S304).

The transmitter 103 transmits the RS information included in control data from the selected antenna (step S305). Subsequently, the transmitter 103 transmits user data using all the antennas of the antenna array 102 (step S306).

Figure 4:
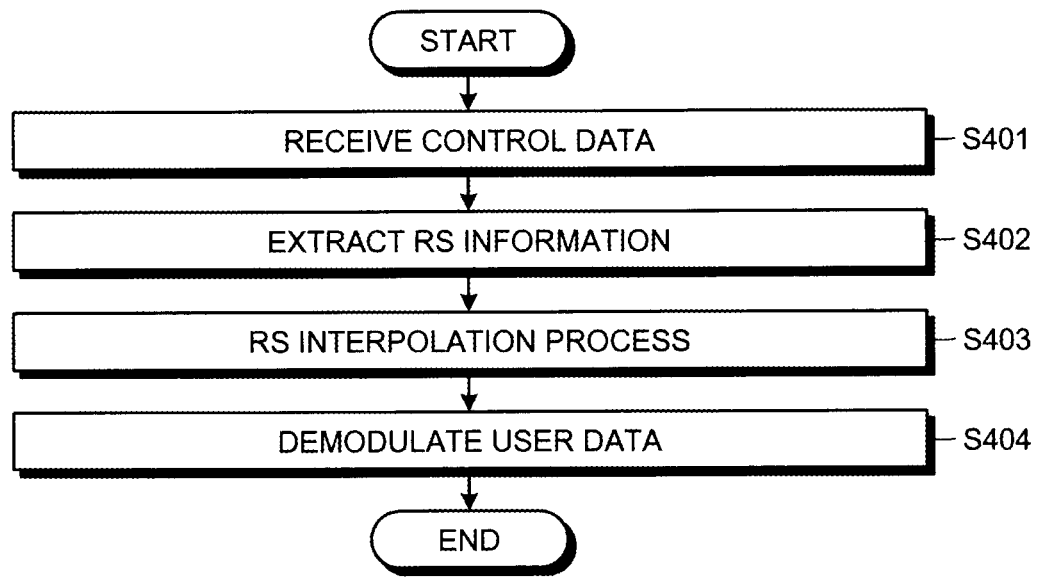
FIG. 4 is a flowchart of an RS transmission process carried out by a reception-side base station apparatus.

FIG. 4 is a flowchart of an RS transmission process carried out by the reception-side base station apparatus. At the base station apparatus 110, the receiver 113 receives control data via a control channel (step S401). Upon receiving the control data, the receiver 113 receives RSs, the number of which is equivalent to the number of RSs transmitted by the transmission-side mobile terminal 101. The RS information extracting unit 114 extracts RS information included in this control data (step S402). Here, the RS information extracting unit 114 extracts the number of RS transmissions carried out by the transmission-side mobile terminal 101. Subsequently, the RS interpolating unit 115 carries out an RS interpolation process on an antenna that does not transmit an RS, based on the extracted number of RS transmissions (step S403). The data demodulating unit 116 then determines a channel estimate from RSs and an interpolated RS. Based on this channel estimate, the data demodulating unit 116 demodulates (and decodes) user data transmitted from the transmission-side mobile terminal 101 via a user channel (step S404).

The RS interpolation process will be described. At step S403, the RS interpolating unit 115 identifies the transmission-side mobile terminal 101 based on the control data and from the RS information, acquires the number of antennas of the antenna array 102 that the mobile terminal 102 has. The RS interpolating unit 115 then determines an antenna that has not transmitted an RS, based on the number of RS transmissions, and carries out the RS interpolation process on this antenna. For example, when the cover 202 of the transmission-side mobile terminal 101 of FIG. 2 is closed and the number of RS transmissions is "2", RSs are transmitted from the antennas 102a and 102c not adjacent to each other among the four antennas making up the antenna array 102. At the base station apparatus 110, the RS information extracting unit 114 reads out the set number of antennas "4" of the antenna array 102 of the mobile terminal 101 and the number of RS transmissions "2". From this reading, the RS information extracting unit 114 determines that RSs are transmitted from the antennas 102a and 102c and that the antennas to be interpolated are the antennas 102b and 102d.

The interpolation process is carried out in such a way that for example, the antenna 102b to be interpolated is interpolated based on a received RS transmitted by the antenna 102a close to the antenna 102b and that the antenna 102d is interpolated based on a received RS transmitted by the antenna 102c close to the antenna 102d. In the configuration depicted in FIG. 2, when the cover 202 of the mobile terminal 101 is closed, the antennas 102a and 102c are in close proximity to each other and the antennas 102b and 102d are in close proximity to each other. In this configuration, the antennas 102b and 102d to be interpolated may be interpolated using the same RSs as the RSs sent from the antennas 102a and 102c.

The transmission-side mobile terminal 101 may add to the above described RS information, information of an antenna transmitting an RS or information of an antenna not transmitting an RS. The reception-side base station apparatus 110 is able to easily identify from the information of an antenna transmitting an RS (or not transmitting an RS), an antenna to be interpolated and not transmitting an RS and is able to estimate an RS channel using an RS from an antenna having transmitted the RS that is close (adjacent) to the antenna not transmitting an RS. The interpolation process is not limited to hereto but may be carried out by using an average of received RSs from antennas and a value given by linear interpolation.

According to the above configuration, the transmission-side mobile terminal 101 transmits RSs the number of which is less than the number of antennas of the antenna array 102 through culling of RSs, and the reception-side base station apparatus 110 receives user data after an interpolation process is carried out on each of the antennas of the antenna array 102. As a result, main user data is transmitted/received using the optimal number of RS transmissions corresponding to the varying correlation between the antennas of the antenna array 102 of the mobile terminal 101 as an unnecessary RS is not transmitted. Hence, transmission power consumption by the mobile terminal 101 is reduced. In addition, interference with other base station apparatuses or other mobile terminals is also reduced.

Figure 5:
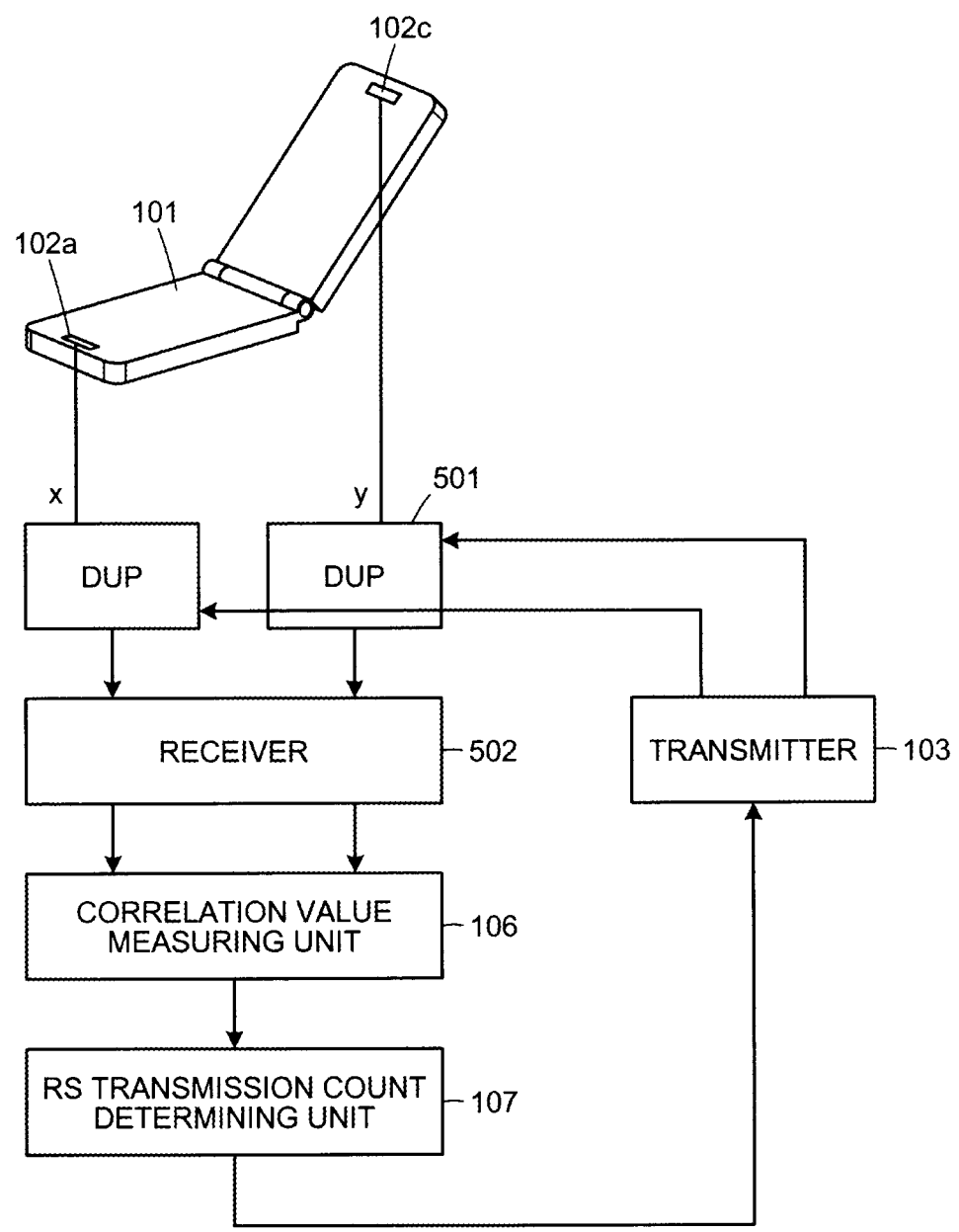
FIG. 5 is a block diagram of a configuration of the mobile terminal according to a second embodiment.

FIG. 5 is a block diagram of a configuration of a mobile terminal according to a second embodiment. As depicted in FIG. 5, according to the second embodiment, the reception-side mobile terminal 101 calculates a correlation value directly from signals received by the antenna array. The antenna interval detecting unit 105 of FIG. 1, therefore, is not used. This will be explained for a case where the number of antennas making up the antenna array 102 of the mobile terminal 101 is "2", which represents two antennas 102a and 102c between which the interval varies. Although component units are depicted outside the mobile terminal 101 for convenience, these component units are actually incorporated in the mobile terminal 101.

The mobile terminal 101 is provided with duplicators (DUP) 501 of which the number is the same as the number of antennas making up the antenna array 102. A receiver 502 and the transmitter 103 are connected to the duplicators (DUP) 501 and, transmit and receive data as described above. The receiver 502 receives reception signals x and y via the antennas 102a and 102c. The correlation value measuring unit 106 calculates a correlation value based on the reception signals x and y.

For example, a correlation value is calculated using an equation: correlation value $z=\langle x \times y \rangle / \sqrt{(|x||x||y||y|)}$. The product of the reception levels (reception power) of reception signals x and y when radio waves from the base station apparatus 110 are received by the antennas 101a and 101c is calculated, and a reception power average "$\langle x\ y \rangle$" is calculated using a proper sample number. Meanwhile, an average of the roots of the product of power of the reception signal x and the reception signal y "$\sqrt{(|x||x||y||y|)}$" are also calculated respectively and "$\langle x \times y \rangle$" is divided by "$\sqrt{|x||x||y||y|}$)" to calculate the correlation value z. Based on the correlation value z, the RS transmission count determining unit 107 determines whether a prescribed SN ratio is satisfied and determines the number of RS transmissions.

Figure 6:
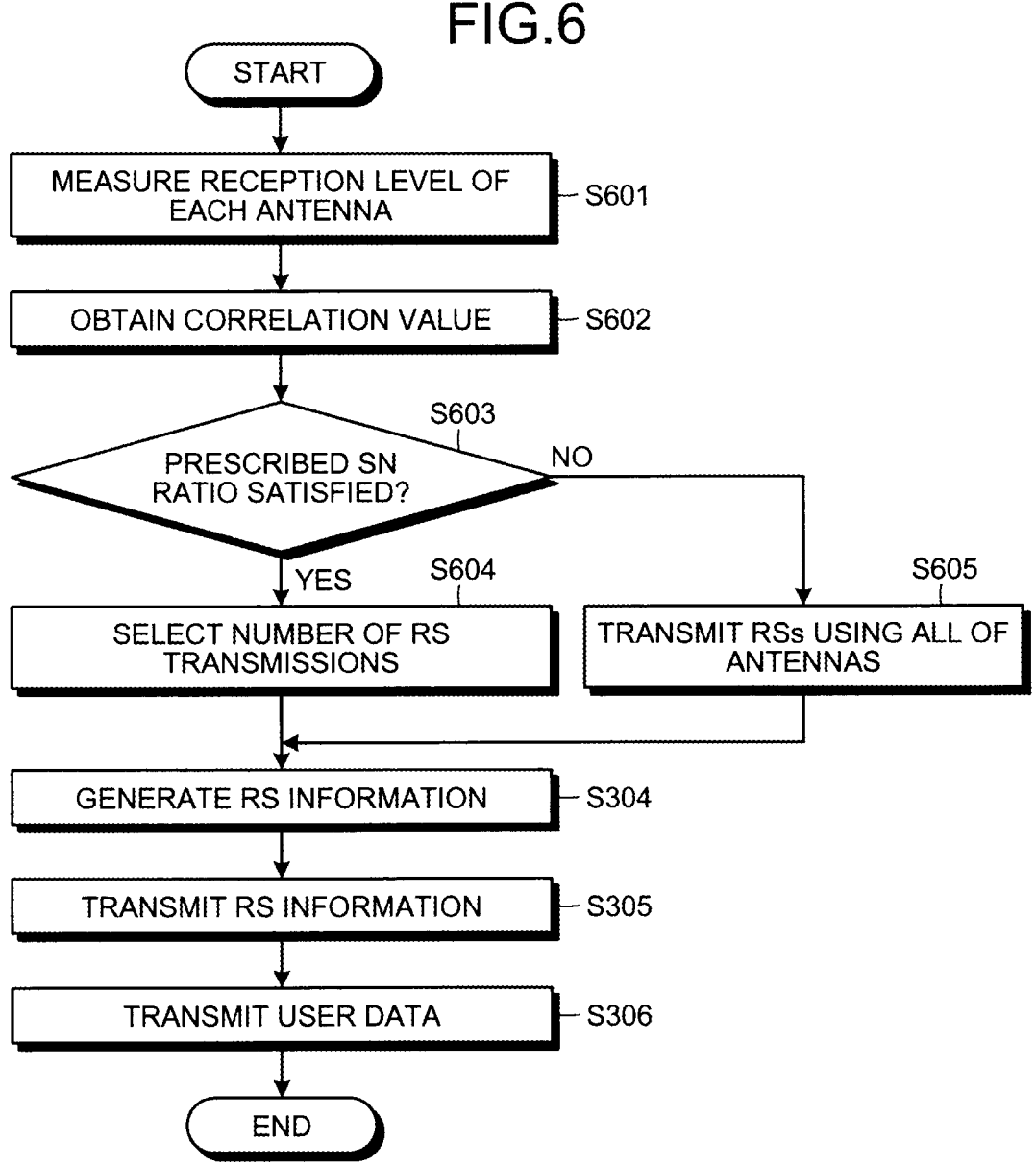
FIG. 6 is a flowchart of an RS transmission process carried out by the transmission-side mobile terminal.

FIG. 6 is a flowchart of an RS transmission process carried out by the transmission-side mobile terminal. The receiver 502 measures reception levels at the antennas 102a and 102c of the antenna array 102 (step S601). Subsequently, the correlation value measuring unit 106 applies the reception levels to the above correlation value equation to calculate the correlation value z representing the correlation between antennas (step S602). The RS transmission count determining unit 107 then determines whether the prescribed SN ratio is satisfied, based on the correlation value z (step S603). If the SN ratio is satisfied (step S603: YES), the number of RS transmissions is selected to use some of antennas making up the antenna array 102 (step S604). If the SN ratio is not satisfied (step S603: NO), RSs are transmitted using all of the antennas of the antenna array 102 (step S605).

In this manner, the mobile terminal 101 determines the number of RS transmissions using the reception levels of signals from the base station apparatus 110. Here, the number of RS transmissions is determined by taking into consideration a variation in the state of the propagation path between the base station apparatus 110 and the mobile terminal 101. The variation is calculated using radio waves from the base station apparatus 110, when the state of the antenna array 102 of the mobile terminal 101 varies. It is assumed, therefore, the state of the propagation path is the same for transmission of signals from the mobile terminal 101, and the number of RS transmissions from the mobile terminal 101 is determined based on this assumption. The number of RS transmissions is determined using, for example, an equation: correlation $z^2=\gamma/(1+\gamma)$, where ($\gamma$: prescribed SN ratio).

Afterward, generation of RS information (step S304), transmission of RS information (step S305), and transmission of user data (step S306) are carried out in the same manner as in the first embodiment (FIG. 3).

When the number of antennas of the antenna array 102 is 2, as depicted in FIG. 5, the number of RS transmissions is determined to be "1" at step S604 and is determined to be "2" at step S605. In this manner, the number of RS transmissions is changed based on the prescribed SN ratio. This is not the only case. When the number of antennas of the antenna array 102 is 3 or larger, correlation values are calculated for all combinations of antennas and the above process is carried out on a combination of antennas for which the correlation value is the largest. Among the remaining antennas, the above process is also carried out on a combination of antennas for which the correlation value is the largest. This process is repeated until a correlation value for the remaining antennas becomes equal to or less than a prescribed threshold. Hence, the number of antennas that are to transmit RSs is determined.

According to the second embodiment, a correlation value is calculated using the reception level of a signal received at the mobile terminal 101 when the state of the antenna array 102 of the mobile terminal 101 varies, and is used for determining the number of RS transmissions when RSs are transmitted. In this manner, RSs can be transmitted in a number that is determined according to the actual state of the mobile terminal 101 and to the state of the propagation path at a point of time of RS transmission without using a specific unit for detecting an antenna interval.

A third embodiment is a configuration example in which a transmission format is changed according to a change in the number of RS transmissions. According to the above first and second embodiments, the number of RS transmissions is changed to cull antennas in transmission of RSs. According to the third embodiment, an antenna that does not transmit an RS transmits a transmission format of user data as control data, instead of transmitting an RS, during a period of no RS transmission. At the transmission-side mobile terminal 101, the receiver 103 transmits the transmission format. At the reception-side base station apparatus 110, the receiver 113 receives the transmission format from the mobile terminal 101 and switches to the reception format corresponding to the received transmission format to receive user data.

Figure 7:
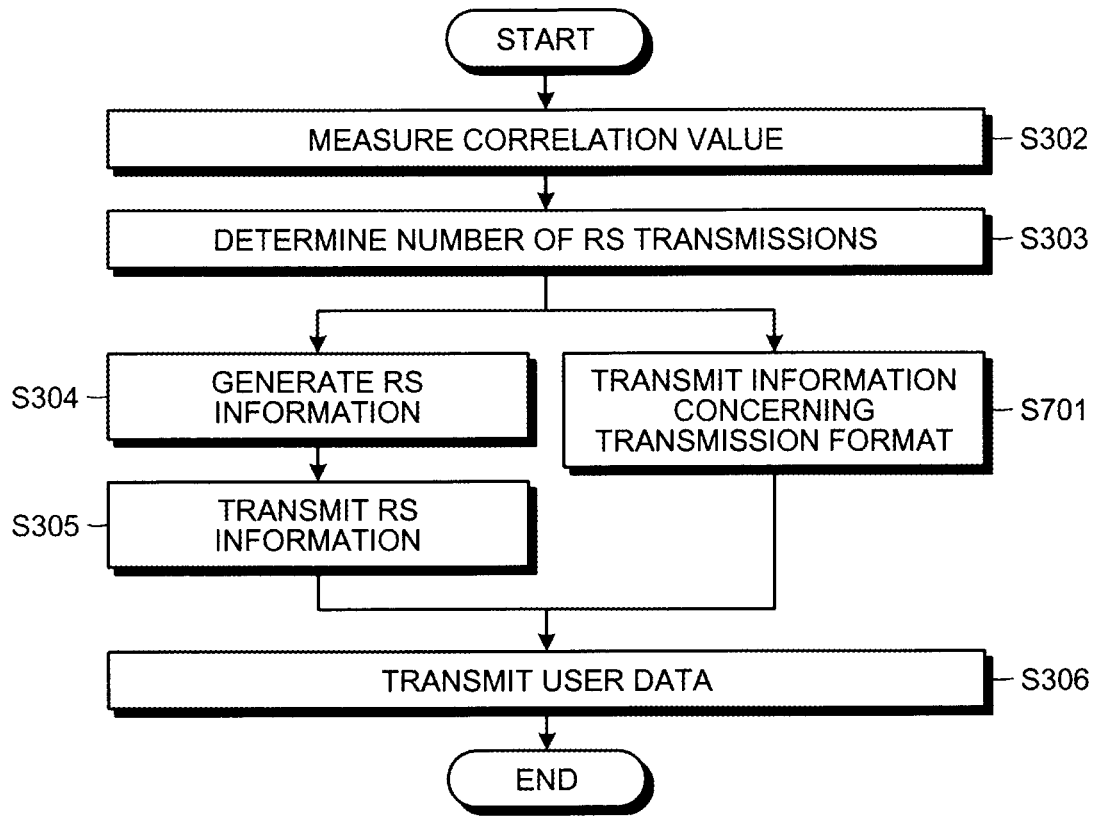
FIG. 7 is a flowchart of an RS transmission process carried out by the transmission-side mobile terminal according to a third embodiment.

FIG. 7 is a flowchart of an RS transmission process carried out by the transmission-side mobile terminal according to the third embodiment. Measurement of a correlation value at step S302 is carried out as, for example, detection of an antenna interval described in the first embodiment or measurement of a reception level at the antenna array described in the second embodiment. Based on an acquired correlation value, the RS transmission count determining unit 107 determines the number of RS transmissions (step S303).

The RS transmission count determining unit 107 then generates RS information that includes the determined number of RS transmissions (step S304). In parallel with this step, the transmitter 103 selects a transmission format corresponding to the number of RS transmissions. This transmission format is information of the time-based position of user data and RSs in each radio frame, transmission antennas, a data modulation method, the coding rare of error correction codes, etc.

The transmitter 103 then transmits the RS information incorporated in control data from antennas that transmit RSs (step S305). At the same time, the transmitter 103 transmits information concerning the selected transmission format using an antenna that does not transmit an RS (step S701). Subsequently, the transmitter 103 transmits user data in the selected transmission format, using all antennas (step S306). For example, when the number of RS transmissions is changed, a modulation method by the modulating unit 104 included in the transmitter 103 is changed. When the number of RS transmissions is reduced, a modulation method achieving better signal-to-noise ratio characteristics (superior SN ratio) may be adopted.

Figure 8:
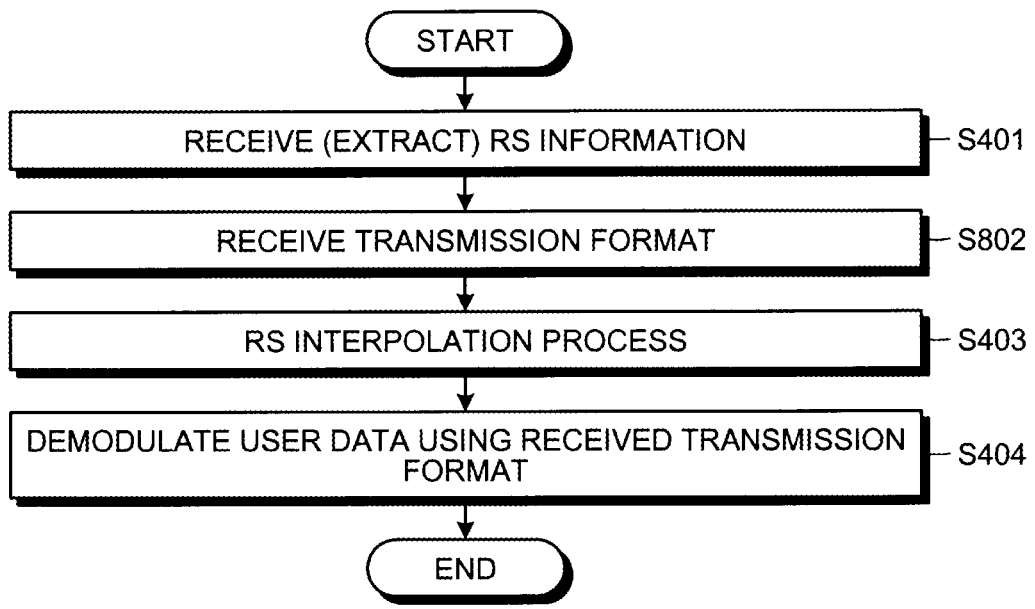
FIG. 8 is a flowchart of an RS transmission process carried out by the reception-side base station apparatus according to the third embodiment.

FIG. 8 is a flowchart of an RS transmission process carried out by the reception-side base station apparatus according to the third embodiment. The receiver 113 receives RS information transmitted from the transmission-side mobile terminal 101 (step S401) and also receives a transmission format (step S802). Depending on the configuration of the receiver 113, the receiver 113 may carry out the reception process at step S401 first and then carry out the reception process at step S802, as depicted in FIG. 8. The RS interpolating unit 115 carries out an RS interpolation process on an antenna that does not transmit an RS, based on the received number of RS transmissions (step S403). Subsequently, the data demodulating unit 116 acquires RSs and a channel estimate determined based on an interpolated RS. Based on the channel estimation value, the data demodulating unit 116 demodulates (and decodes) user data transmitted from the transmission-side mobile terminal 101 via a user channel (step S404). Here, the receiver 113 and the data demodulating unit 116 switch to the reception format corresponding to the transmission format received at step S802 to receive the user data. Not only the reception format used by the receiver 113 but also a coding method used by the data demodulating unit 116 in its data demodulation may also be switched.

According to the third embodiment, the transmission-side mobile terminal 101 transmits a transmission format using an antenna that does not transmit an RS. This improves data transmission efficiency.

Figure 9:
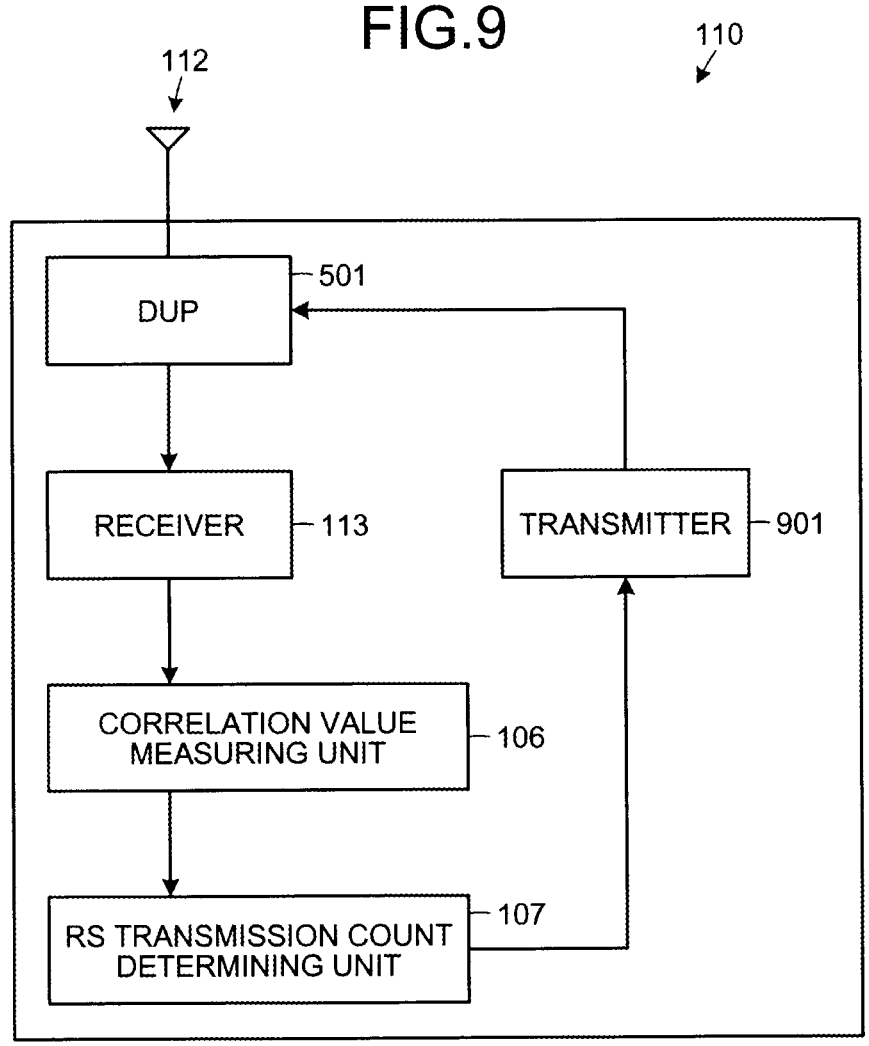
FIG. 9 is a block diagram of a configuration of the reception-side base station apparatus according to a fourth embodiment.

FIG. 9 is a block diagram of a configuration of the reception-side base station apparatus according to a fourth embodiment. According to the above embodiments, the transmission-side mobile terminal 101 calculates a correlation value representing the correlation between antennas and determines an antenna that is to transmit an RS. According to the forth embodiment, this process is carried out by the base station apparatus 110. As depicted in FIG. 9, the base station apparatus 110 is provided with the correlation value measuring unit 106 and the RS transmission count determining unit 107 of FIG. 5. FIG. 9 mainly depicts a configuration in which the base station apparatus 110 determines the number of RS transmissions.

A configuration of the mobile terminal 101, which is not depicted, is given by omitting the correlation value measuring unit 106 and the RS transmission count determining unit 107 from the configuration depicted in FIG. 5.

The receiver 113 and a transmitter 901 are connected to the duplicators (DUP) 501 and transmit and receive data to and from the mobile terminal 101. It is assumed that the mobile terminal 101 transmits RSs from two antennas 102a and 102c, as in the above case. The receiver 113 of the base station apparatus 110 receives RS reception signals x and y from the mobile terminal 101 via the antenna 112. The correlation value measuring unit 106 calculates a correlation value based on the reception signals x and y.

For example, a correlation value is calculated using the equation: correlation value $z=\langle xxy \rangle / \sqrt{(|x\|x\|y\|y|)}$. The product of the reception levels (reception power) of reception signals x and y when RSs from the antennas 102a and 102c of the transmission-side mobile terminal 101 are received at the base station apparatus 110 is calculated, and a reception power average "$\langle xxy \rangle$" is calculated using a proper sample number. Meanwhile, an average of the root of the products of power of the reception signal x and the reception signal y "$\sqrt{(|x\|x\|y\|y|)}$" are also calculated and "$\langle xxy \rangle$" divided by "$\sqrt{(|x\|x\|y\|y|)}$" to calculate the correlation value z. Based on the correlation value z, the RS transmission count determining unit 107 determines whether a prescribed SN ratio is satisfied and determines the number of RS transmissions. The determined number of RS transmissions is transmitted to the mobile terminal 101 via the transmitter 901.

In a case of multi-carrier communication, such as OFDM, the above correlation value measurement is carried out in such a way that the correlation value measuring unit 106 makes a correlation matrix for each of subcarriers for RS reception, calculates a correlation for each subcarrier, and compares an average error or maximum error of calculated correlations with a reference value to determine a correlation value. In a case of CDMA, etc., a correlation is calculated for each path of multiple paths, as calculated for each subcarrier in the above case.

FIG. 10 is a flowchart of a process of determining the number of RS transmissions carried out by the base station apparatus. The receiver 113 measures reception levels at the antennas 102a and 102c of the antenna array 102 of the mobile terminal 101 (step S601). Subsequently, the correlation value measuring unit 106 applies the reception levels to the above correlation value equation to calculate the correlation value z representing the correlation between antennas (step S602). The RS transmission count determining unit 107 then determines whether the prescribed SN ratio is satisfied, based on the correlation value z (step S603). If the SN ratio is satisfied (step S603: YES), the number of RS transmissions is selected to use some of antennas making up the antenna array 102 of the mobile terminal 101 (step S604). If the SN ratio is not satisfied (step S603: NO), the number of RS transmissions is determined to be the number of all of the antennas of the antenna array 102 (step S1005). Following generation of RS information (step S304), the RS information is transmitted to the mobile terminal 101 (step S305).

In this manner, the base station apparatus 110 determines the number of RS transmissions by the mobile terminal 101 using the reception levels of RSs from the mobile terminal 101. Here, the number of RS transmissions is determined by taking into consideration the variation in the state of a propagation path between the mobile terminal 101 and the base station apparatus 110. The variation is calculated using radio waves from the mobile terminal 101, when the state of the antenna array 102 of the mobile terminal 101 varies. The number of RS transmissions is determined using, for example, the equation: correlation $z^2=\gamma/(1+\gamma)$, where ($\gamma$: prescribed SN ratio).

When the number of antennas of the antenna array 102 of the mobile terminal 101 is 2, as depicted in FIG. 5, the number of RS transmissions is determined to be "1" at step S604 and is determined to be "2" at step S1005. In this manner, the number of RS transmissions is changed based on the prescribed SN ratio. This is not the only case. When the number of antennas of the antenna array 102 is 3 or larger, correlation values are calculated for all combinations of antennas and the above process is carried out on a combination of antennas for which a correlation value is the largest. Among the remaining antennas, the above process is also carried out on a combination of antennas for which a correlation value is the largest. This process is repeated until a correlation value for the remaining antennas becomes equal to or less than a prescribed threshold. Hence, the number of antennas that transmit RSs is determined.

FIG. 11 is a flowchart of an RS transmission process carried out by the mobile terminal. RS information including the number of RS transmissions determined by the base station apparatus 110 is received by the receiver 502 of the mobile terminal 101 (step S1101). The transmitter 103 determines a transmission format corresponding to the number of RS transmissions (step S1102), and transmits RSs from antennas corresponding to the number of RS transmissions (step S1103). Subsequently, the transmitter 103 transmits user data in the selected transmission format, using all the antennas (step S1104). For example, when the number of RS transmissions is changed, a modulation method by the modulating unit 104 included in the transmitter 103 is changed.

According to the forth embodiment, the base station apparatus 110 measures a correlation value and determines the number of RS transmissions. This reduces processing load on the mobile terminal 101.

Figure 12A:
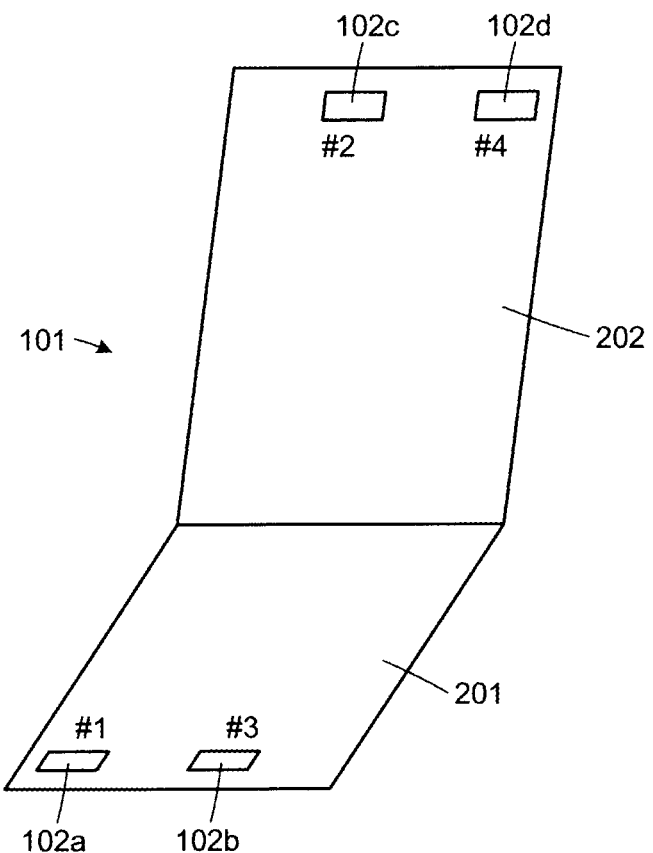
FIG. 12A is an external view of the mobile terminal in an opened state.
Figure 12B:
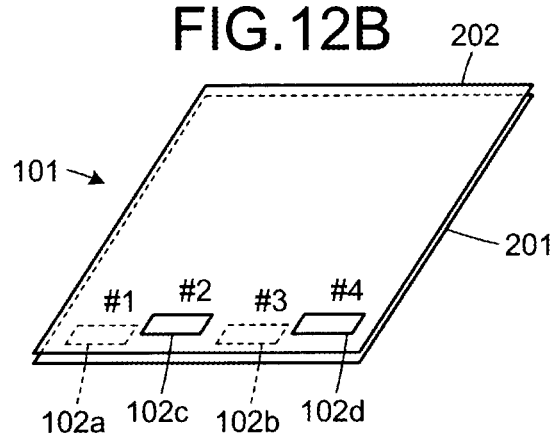
FIG. 12B is an external view of the mobile terminal in a closed state.

A fifth embodiment relates to patterning of the number of RS transmissions at the mobile terminal 101. FIG. 12A is an external view of the mobile terminal in the opened state; and FIG. 12B is an external view of the mobile terminal in the closed state. Similar to the mobile terminal 101 of FIG. 2, the mobile terminal 101 includes the body 201, the cover 202, and the antenna array 102 including four (n=4) antennas. Two antennas 102c and 102d disposed on the cover 202 are shifted laterally relative to the two antennas 102a and 102b disposed on the body 201 so that none of the antennas 102a to 102d overlap when the cover 202 is closed.

When the cover 202 of the mobile terminal 101 is opened, an interval between antennas is sufficiently wide, so that RSs are transmitted from all of four antennas 102a to 102d. When the cover 202 is closed, RSs are transmitted from two antennas selected from among four antennas 102a to 102d. This configuration example will be described.

When RSs are transmitted from two antennas, many combinations of antennas are considered. To communicate a combination of antennas that transmit RSs to the base station apparatus 110, the mobile terminal 101 uses data representing four antennas, i.e., 4-bit data, as RS information. By determining a fixed pattern of the optimal culling of RSs for selecting the number of RS transmissions, combinations (number of bits) of antennas that transmit RSs can be reduced.

FIG. 13 is a table indicating an example of combination patterns by the number of RS transmissions. The RS transmission count determining unit 107 has a memory unit that stores therein RS combination information 1301 depicted in FIG. 13. According to the RS combination information 1301 depicted in FIG. 13, when the number of RS transmissions (RS transmission count) is "1", only the antenna #1 (102a) transmits an RS. When the number of RS transmissions is "2", the antennas #1 (102a) and #3 (102b) transmit RSs. When the number of RS transmissions is "3", the antennas #1 (102a), antennas #2 (102c), and #3 (102b) transmit RSs. When the number of RS transmissions is "4", all of the antennas #1 to #4 (102a to 102d) transmit RSs. The RS combination information 1301 is transmitted from the mobile terminal 101 to the base station apparatus 110, at which the RS information extracting unit 114 stores the RS combination information 1301 to a memory unit (not depicted).

In this manner, by allowing the mobile terminal 101 and the base station apparatus 110 to share RS combination information indicative of antenna combinations corresponding to the numbers of transmission of RSs, information for identifying an antenna that is to transmit an RS can be omitted from RS information. When the tabled RS combination information depicted in FIG. 13 is used, the mobile terminal 101 just transmits any one of four kinds of the number of RS transmissions "1" to "4", for which only 2 bits are needed. The base station apparatus 110 receives any one of the numbers of transmission of RSs "1" to "4". Based on the same RS combination information as depicted in FIG. 13, the RS information extracting unit 114 is able to identify a combination of the antennas that has transmitted RSs from the mobile terminal 101.

FIG. 14 is a flowchart of an RS transmission process using RS combination information carried out by the mobile terminal. The mobile terminal 101 generates the RS combination information 1301 (step S1401) and transmits the generated RS combination information 1301 to the base station apparatus 110 (step S1402). Steps 1401 and 1402 are carried out as presetting. The mobile terminal 101 transmits the RS combination information 1301 only once as far as the arrangement of the antennas 102a to 102d of the antenna array 102 does not vary.

The process to follow is almost the same as the process in the above embodiments. The correlation value measuring unit 106 measures a correlation value (step S302), and the RS transmission count determining unit 107 determines the number of RS transmissions (step S303) and generates RS information (step S304). This RS information is transmitted as 2-bit data indicative of any one of the numbers of transmission of RSs "1" to "4" in the RS combination information 1301 (step S305). Subsequently, the transmitter 103 determines a transmission format corresponding to the number of RS transmissions (step S1102), and transmits RSs from the antennas corresponding to the number of RS transmissions (step S1103). The transmitter 103 then transmits user data in the selected format, using all of the antennas (step S1104).

Figure 15:
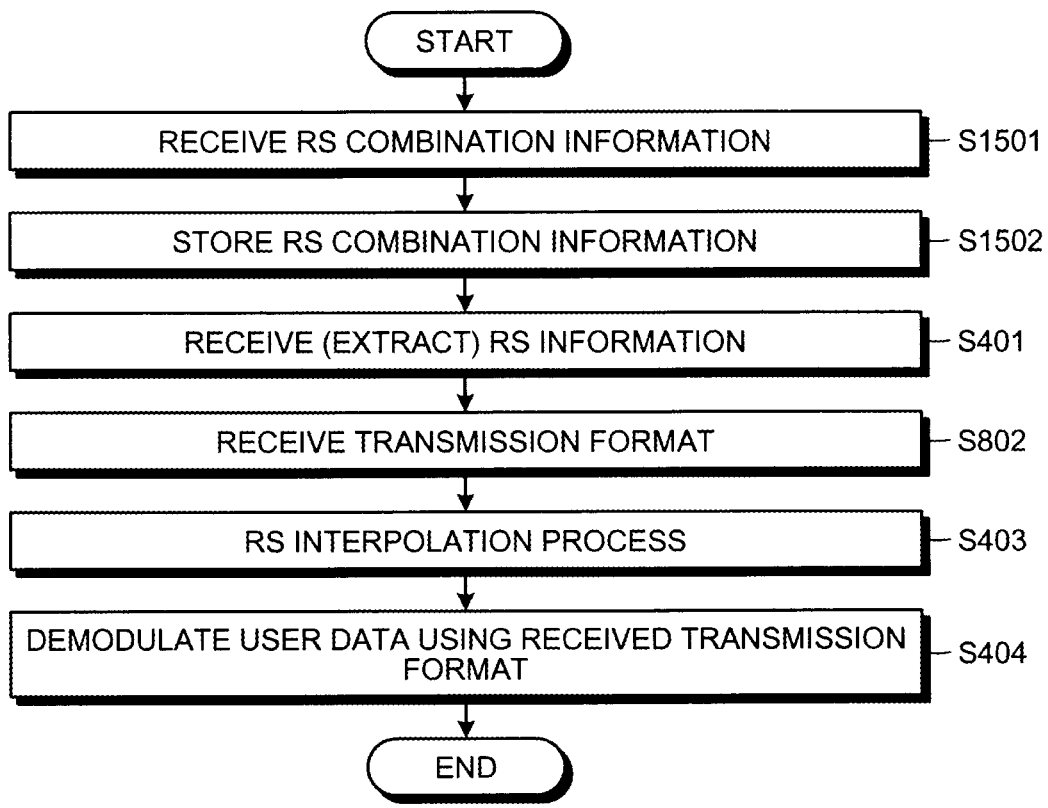
FIG. 15 is a flowchart of an RS reception process using RS combination information carried out by the base station apparatus.

FIG. 15 is a flowchart of an RS reception process using RS combination information carried out by the base station apparatus. When receiving the RS combination information 1301 transmitted from the mobile terminal 101 (step S1501), the base station apparatus 110 stores the RS combination information 1301 to the memory unit of the RS extracting unit 114 (step S1502).

The process to follow is almost the same as the process in the above embodiments. The receiver 113 receives RS information transmitted from the transmission-side mobile terminal 101 (step S401). This RS information is 2-bit data indicative of any one of the numbers of transmission of RSs "1" to "4". Following reception of the number of RS transmissions, the RS information extracting unit 114 reads the RS combination information 1301 from among the memory unit and identifies antennas of the mobile terminal 101 that correspond to the number of RS transmissions. Following reception of a transmission format (step S802), the RS interpolating unit 115 carries out an RS interpolation process on an antenna that does not transmit an RS, the antenna is identified based on the received number of RS transmissions (step S403). Subsequently, the data demodulating unit 116 acquires RSs and a channel estimate calculated based on an interpolated RS. Based on this channel estimate, the data demodulating unit 116 demodulates and decodes user data transmitted from the transmission-side mobile terminal 101 via a user channel (step S404). Here, the receiver 113 and the data demodulating unit 116 switch to the reception format corresponding to the transmission format received at step S802 and receive the user data.

Using the RS combination information 1301 described in the fifth embodiment makes it unnecessary for the mobile terminal 101 to send information of an antenna transmitting an RS every time transmitting an RS and makes it possible for the mobile terminal 101 to given notification of an antenna transmitting an RS, using less data bits. Hence, increases in overhead are prevented.

While the fifth embodiment offers a configuration in which the RS combination information 1301 is transmitted from the mobile terminal 101 to the base station apparatus 100, other configurations may also be conceivable. This RS combination information 1301 may be input to the base station apparatus 110 or set in the base station apparatus 110 via a superior apparatus. Such a configuration saves the mobile terminal 101 trouble of making the RS combination information 1301 and transmitting the RS combination information 1301 to the base station apparatus 110. Another configuration is also possible, in which the RS combination information 1301 is transmitted from the base station apparatus 110 to the mobile terminal 101 and is stored therein.

Figure 16A:
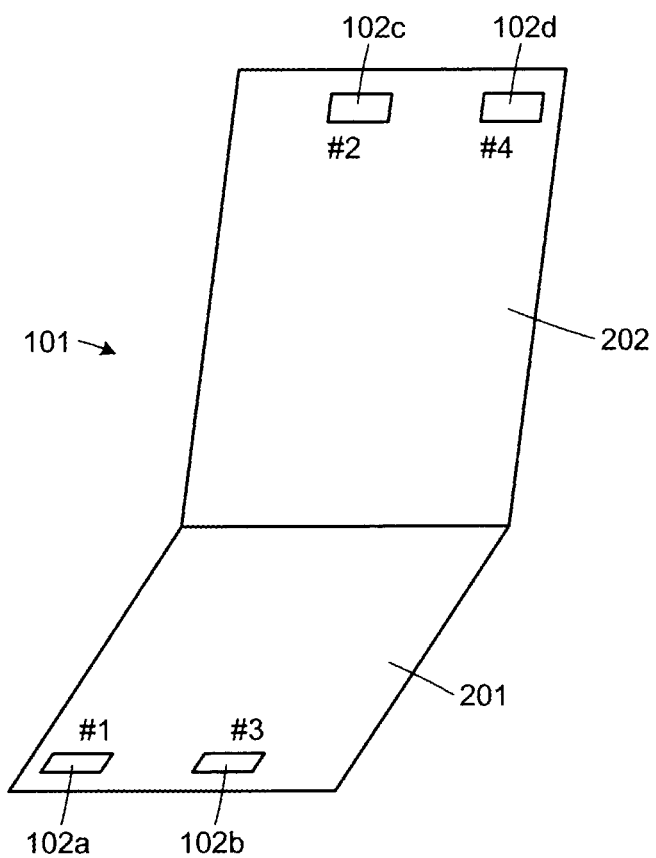
FIG. 16A depicts the mobile terminal 101 with a cover 202 opened widely.
Figure 16B:
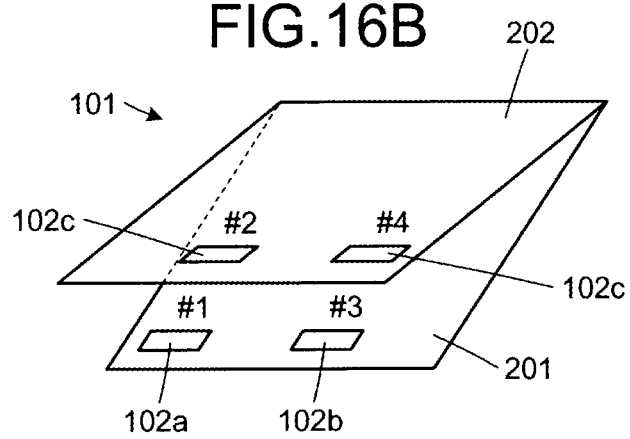
FIG. 16B depicts the mobile terminal 101 with the cover 202 opened slightly.
Figure 16C:
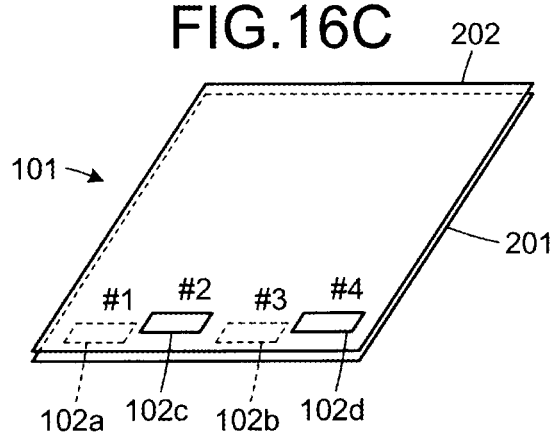
FIG. 16C depicts the mobile terminal 101 with the cover 202 closed.

A sixth embodiment relates to an RS interpolating method. FIGS. 16A, 16B, and 16C are external views of the mobile terminal in the opened and closed states. External views are presented to explain RS interpolation. FIG. 16A depicts the mobile terminal 101 with the cover 202 opened widely; FIG. 16B depicts the mobile terminal 101 with the cover 202 slightly opened; and FIG. 16C depicts the mobile terminal 101 with the cover 202 closed. At the mobile terminal 101, the RS transmission count determining unit 107 determines an equation and coefficients used for RS interpolation according to the variation in the antenna interval, and transmits the equation and coefficients to the RS interpolating unit 115 of the base station apparatus 110.

When the cover 202 of the mobile terminal 101 is opened widely, as depicted in FIG. 16A, all of the antennas #1 (102$a$) to #4 (102$d$) of the antenna array 102 transmit RSs, in which case RS interpolation is unnecessary. When the cover 202 is slightly opened, as depicted in FIG. 16B, the antenna #4 (102$d$) does not transmit an RS. It is assumed that the reception levels of RSs from the antennas #1 (102$a$) to #3 (102$b$) are h1, h2, and h3, respectively. It is observed that the antennas #1 (102$a$) to #4 (102$d$) are arranged on four corners of a parallelogram, respectively. This parallelogram formed of the antennas #1 (102$a$) to #4 (102$d$) has diagonals that intersect with each other at their respective midpoint. Therefore, an average of the reception levels of the antenna #1 (102$a$) and the antenna #4 (102$d$) and an average of the reception levels of the antenna #2 (102$c$) and the antenna #3 (102$b$) are each equivalent to the midpoint. It follows then h1+h4=h2+h3. Hence, the antenna #4, which is to be interpolated, can be interpolated using an interpolation equation: h4=−h1+h2+h3. The RS transmission count determining unit 107 incorporates the interpolation equation and coefficients into RS information and transmits the RS information.

When the cover 202 is closed, as depicted in FIG. 16C, four antennas #1 (102$a$) to #4 (102$d$) are aligned. In such a case, the antenna #2 (102$c$) and the antenna #4 (102$d$) on the cover 202 transmit no RS. For the antenna #2 (102$c$) to be interpolated, the RS transmission count determining unit 107 transmits an interpolation equation: h2=0.5×h1+0.5×h2 (internally dividing point) and coefficients. For the antenna #4 (102$d$) to be interpolated, the RS transmission count determining unit 107 transmits an interpolation equation: h4=−0.5×h1+1.5×h2 (externally dividing point) and coefficients. In this manner, the RS interpolating unit 115 transmits an interpolation equation and coefficients that are switched according to the number of RS transmissions. Three types of states are described in this example, but the angle of rotation usually varies continuously. To correspond with a continuous variation in the angle of rotation, therefore, the above coefficients (0.5, 1.5, ±, etc.) are changed according to the angle of rotation when used.

Figure 17:
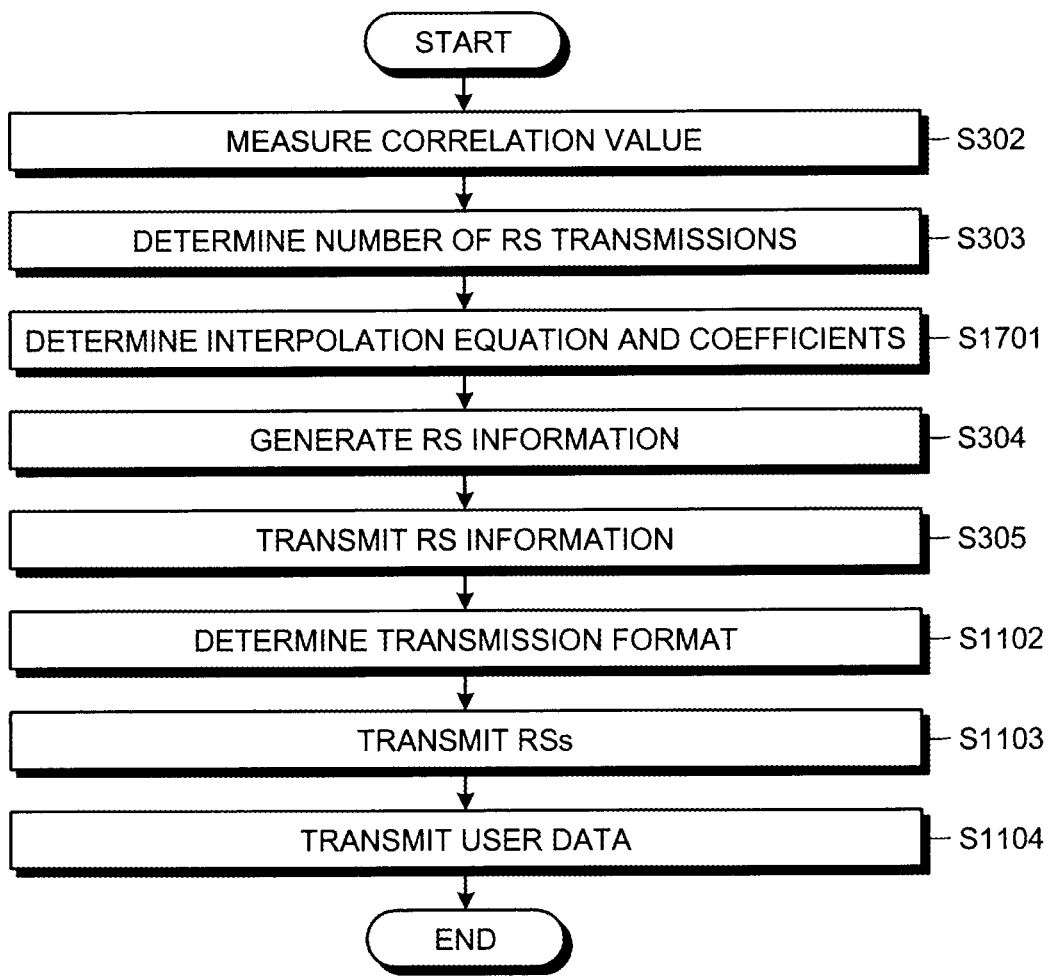
FIG. 17 is a flowchart of an RS transmission process including transmission of RS interpolation information carried out by the mobile terminal.

FIG. 17 is a flowchart of an RS transmission process including transmission of RS interpolation information carried out by the mobile terminal. The correlation value measuring unit 106 measures a correlation value for the antennas (step S302), and the RS transmission count determining unit 107 determines the number of RS transmissions according to the acquired correlation value (step S303). Here, antennas that transmit RSs are determined from among antennas making up the antenna array 102 that transmits RSs according to the number of RS transmissions. The above interpolation equation and coefficients are also determined (step S1701). Subsequently, the RS transmission count determining unit 107 generates RS information in which the interpolation equation and coefficients are included (step S304).

The transmitter 103 incorporates the RS information in control data and transmits the control data from a selected antenna (step S305). The receiver 103 then determines a transmission format corresponding to the number of RS transmissions (step S1102) and transmits RSs from antennas corresponding to the number of RS transmissions (step S1103). Subsequently, the transmitter 103 transmits user data in the selected format, using all of the antennas (step S1104).

Figure 18:
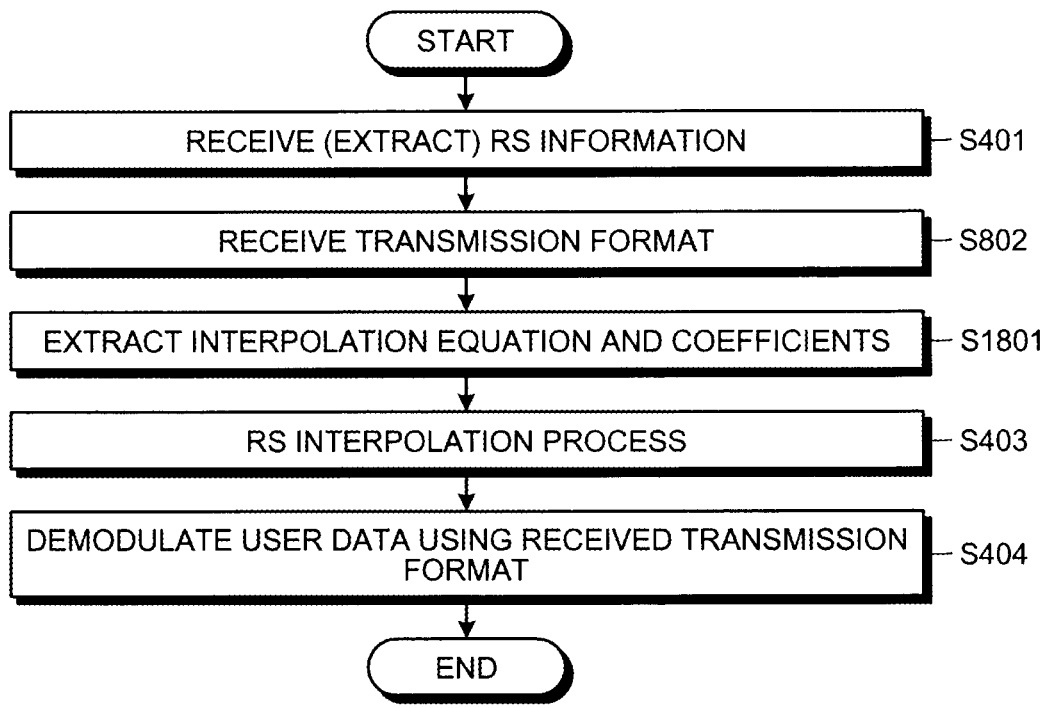
FIG. 18 is a flowchart of an RS transmission process including reception of RS interpolation information carried out by the base station apparatus.

FIG. 18 is a flowchart of an RS transmission process including reception of RS interpolation information carried out by the base station apparatus. At the base station apparatus 110, the receiver 113 receives control data via a control channel to extract RS information (step S401), and also receives a transmission format (step S802). The RS information extracting unit 114 extracts from the RS information included in the control data, the interpolation equation and coefficients determined at the mobile terminal 101 (step S1801). Subsequently, the RS interpolating unit 115 carries out an RS interpolation process on an antenna that does not transmit an RS, using the interpolation equation and coefficients (step S403). The data demodulating unit 116 then acquires RSs and a channel estimate calculated based on an interpolated RS. Based on this channel estimate, the data demodulating unit 116 demodulates (and decodes) user data transmitted from the transmission-side mobile terminal 101 via a user channel (step S804). Here, the receiver 113 and the data demodulating unit 116 switch to the reception format corresponding to the transmission format received at step S802 and receive the user data.

According to the sixth embodiment, the mobile terminal 101 transmits the coefficients of the interpolation equation to the base station apparatus after determining an antenna that is to transmit an RS, and the base station apparatus 110 receives the interpolation equation and coefficients before the RS interpolation process is carried out. This procedure enables more accurate RS interpolation and thereby, improves radio transmission performance. The interpolation equation and coefficients are transmitted to the base station apparatus 110 once in the beginning. Afterward, however, configuration may be such that when the shape of the mobile terminal 101 is shifted varying the antenna interval (varying the correlation value), only the variation coefficients are transmitted.

As described, according to the disclosed technique, even if the antenna interval of the transmitting apparatus varies, the optimal antenna is selected according to the variation and a pilot signal can be transmitted from the selected antenna. This suppresses overhead and improves transmission efficiency. The receiving apparatus is able to carry out antenna interpolation according to variations in the antenna interval of the transmitting apparatus, enabling an improvement in communication quality.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A mobile terminal comprising:
a plurality of antennas between which an antenna interval varies according to a shape of the mobile terminal;
a processor that selects, from among the antennas and based on a correlation value representing correlation between the antennas, a first combination of antennas corresponding to a first shape of the mobile terminal or a second combination of antennas corresponding to a second shape of the mobile terminal; and
a transmitter configured to transmit a pilot signal to a base station apparatus using the first combination of antennas or the second combination of antennas selected by the processor, wherein the processor generates information concerning selection of the antennas,
the transmitter transmits the information concerning selection of the antennas to a receiving apparatus and transmits the pilot signal using the selected antennas, and
the processor incorporates into the information concerning selection of the antennas, information used for interpolation calculation on an antenna that does not transmit the pilot signal, and transmits the information concerning antenna selection and the incorporated information to the receiving apparatus via the transmitter.

2. The transmitting apparatus according to claim 1, wherein the processor measures a correlation value representing correlation between the antennas and
detects an interval between the antennas, wherein
the processor measures the correlation value based on the detected interval between the antennas.

3. The transmitting apparatus according to claim 1, further comprising:
a receiver configured to receive reception signals via the antennas; and
wherein the processor measures, based on a reception state of each of the signals received by the receiver via the antennas, a correlation value representing correlation between the antennas.

4. The transmitting apparatus according to claim 1, wherein
the transmitter switches a transmission format for a transmission signal according to the antenna selected by the processor and communicates the switched transmission format to the receiving apparatus.

5. A mobile terminal comprising:
a plurality of antennas between which an antenna interval varies according to a shape of the mobile terminal;
a processor that selects, from among the antennas and based on a correlation value representing correlation between the antennas, a first combination of antennas corresponding to a first shape of the mobile terminal or a second combination of antennas corresponding to a second shape of the mobile terminal; and
a transmitter configured to transmit a pilot signal to a base station apparatus using the first combination of antennas or the second combination of antennas selected by the processor,
wherein the processor stores, for each antenna interval, information concerning patterns of selection of the antenna, and,
based on information concerning an antenna interval, reads a stored pattern and selects the first combination of antennas or the second combination of antennas, and wherein
the processor incorporates into information concerning selection of the antennas, information used for interpolation calculation on an antenna that does not transmit the pilot signal, and transmits the information and the incorporated information to a receiving apparatus via the transmitter.

* * * * *